INVENTOR.
MORTON H. LEWIN
BY John V. Regan
ATTORNEY

INVENTOR.
MORTON H. LEWIN
BY John V. Regan
ATTORNEY

INVENTOR.
MORTON H. LEWIN
BY John V. Regan
ATTORNEY

INVENTOR.
MORTON H. LEWIN
BY John V. Regan
ATTORNEY

INVENTOR.
MORTON H. LEWIN
BY John V. Regan
ATTORNEY.

3,175,097
United States Patent Office
Patented Mar. 23, 1965

3,175,097
LOGIC CIRCUITS EMPLOYING TRANSISTORS AND NEGATIVE RESISTANCE DIODES

Morton H. Lewin, Princeton, N.J., assignor to Radio Corporation of America, a corporation of Delaware Filed Jan. 20, 1960, Ser. No. 3,604
18 Claims. (Cl. 307—88.5)

The present invention relates to new and improved circuits which, while not restricted thereto, are especially useful in data processing systems.

Transistors have found numerous applications in logic circuits for computers. Generally, the transistor produces an output at one level to indicate the binary digit "one" and at another level to indicate the binary digit "zero." However, transistors, especially those which are more reasonable in price, have inherent disadvantages. For example, the transistor is subject to drift in response to changing ambient operating conditions, such as temperature, and changing circuit parameters as, for example, due to aging of components. Since in such circuits many transistor stages may be connected in cascade, small amounts of drift in early stages may be amplified substantially by the following stages and cause computational errors. For example, such amplified signals may cause a stage which should be producing an output representative of the binary digit "zero" to switch and produce one representative of the binary digit "one." At the other extreme, when the transistor conducts heavy current as, for example, when it is driven to saturation, transistor storage effects limit the transistor recovery time. In many high-speed computer applications delays due to storage effects are not tolerable.

An object of the present invention is to provide high-speed circuits suitable for computers which have the numerous advantages of transistorized circuits such as small size, low power dissipation, etc., but not the disadvantages discussed above.

Another object of the invention is to provide reliable threshold logic gate circuits which can be made to perform basic logic functions required in digital computers.

Another object of the present invention is to provide new and improved circuits utilizing the advantageous characteristics of transistors and negative resistance diodes.

The invention includes a transistor, an impedance in series with the emitter-to-collector path of the transistor, and negative resistance diode means for maintaining the current through the impedance at one level when the input signal to the transistor is in one range and at another, substantially different level when the input signal is within another range. In one specific form of the invention, a negative resistance diode is connected to the base of the transistor in parallel with the emitter-to-base diode of the transistor and a small value of resistance is connected in series with the emitter. In another form of the invention, a pair of negative resistance diodes are connected in series anode-to-cathode and arranged so that one is in its low voltage state and the other in its high voltage state. In this last-mentioned embodiment, the base of the transistor is connected to the common anode-cathode connection of the series circuit.

The invention will be described in greater detail by reference to the following description taken in connection with the accompanying drawing in which.

Throughout the figures similar reference numerals are applied to similar circuit elements.

Figure 2:
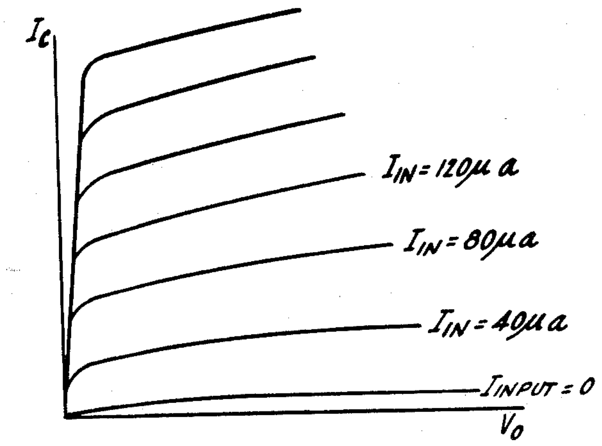
FIG. 2 is a family of curves of collector current versus collector-to-emitter voltage for the transistor in FIG. 1. The running (varying) parameter is input current (base current in this case)
Figure 1:
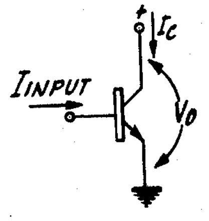
FIG. 1 is a schematic diagram of a transistor circuit.

The circuit of FIG. 1 shows a conventional NPN transistor. Each of the curves in the family of curves of FIG. 2 is obtained by maintaining the base current $I_{in}$ fixed at a given value and then varying the collector voltage. It may be observed that output currents $I_c$ are obtained for very low values of input currents. These output currents are subject to change with changing ambient conditions and circuit parameters and these changes may be disadvantageous in computer applications, as already mentioned.

Figures 3, 4:
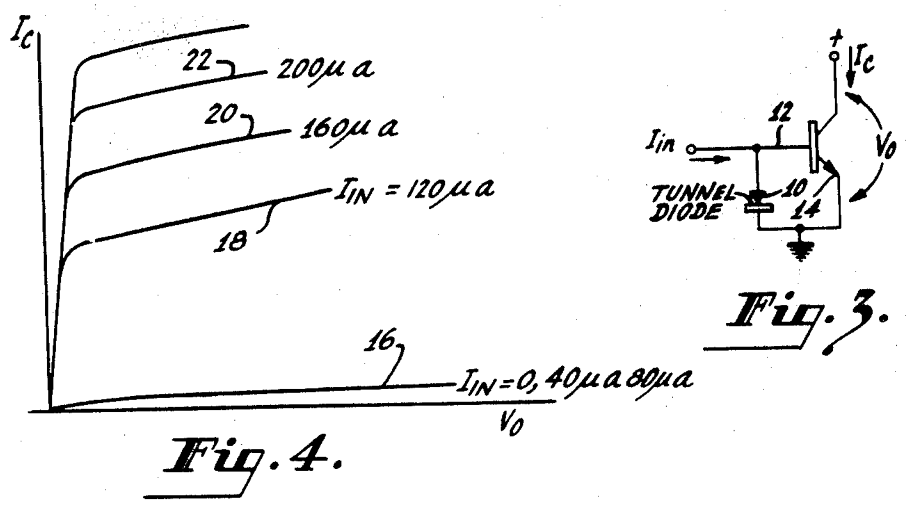
FIG. 3 is a schematic circuit diagram of a circuit including a transistor and a negative resistance diode connected to the base of the transistor.
FIG. 4 is a family of curves of collector current versus emitter-to-collector voltage for the circuit of FIG. 3. The running parameter is input current.

The circuit of FIG. 3 includes a transistor circuit like the one of FIG. 1 with a negative resistance diode 10 connected between the base 12-to-emitter 14 diode of the transistor. The particular type of negative resistance diode 10 employed in the circuit of FIG. 3, sometimes also known as a tunnel diode, is described in an article by Sommers in the Proceedings of the IRE, July 1959, page 1201. As explained in this article, this diode has two positive resistance operating regions and a negative resistance operating region between the two positive resistance regions. When operated with a substantially constant current load line, the diode can operate stably in either one of its positive resistance regions. If the diode is in its low voltage operating region (low state) and sufficient forward current is applied, the diode will abruptly switch to its high voltage operating region (high state). Conversely, when the current through the diode is reduced sufficiently, the diode will switch back from its high state to its low state.

The operation of the circuit of FIG. 3 is illustrated in FIG. 4. It may be assumed that the particular diode 10 employed has a current peak of about 100 microamperes. In other words, if a current of greater than 100 microamperes is applied to the diode, the diode will switch from its low state to its high state. As can be seen from FIG. 4, at 0, 40, and 80 microamperes, substantially the entire input current passes through the tunnel diode and substantially none of it passes through the base 12-to-emitter 14 diode. Accordingly, the emitter-to-collector current $I_c$ remains substantially constant at a very low value as is indicated by curve 16. When, however, the input current exceeds the current peak of the tunnel diode, the diode suddenly switches from its low state to its high state. The maximum voltage across the diode, when in its low state, may be of the order of 50 millivolts or so. When the diode switches to its high state, the voltage across it may assume a value of 400 millivolts. At this higher voltage value, the emitter-to-base diode of the transistor is forward biased and substantial emitter-to-collector current flows as is indicated by curve 18. As the input current to the circuit is increased further, the emitter-to-collector current increases as indicated by curves 20, 22, etc. The diode does not limit the maximum current through the transistor and the transistor can be driven to saturation with the undesired reduction in speed capability already discussed.

Figures 5, 6:
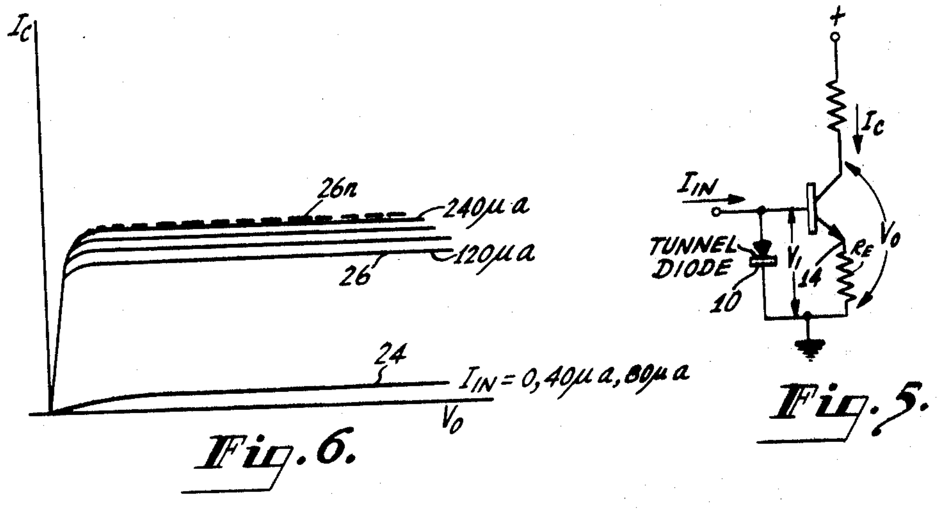
FIG. 5 is a schematic circuit diagram of a transistor-tunnel diode circuit according to the present invention.
FIG. 6 is a family of curves of collector current versus collector voltage for the circuit of FIG. 5. Again, the running parameter is input current.

The difference between the circuit of FIG. 5 and the one of FIG. 3 is that now a small value of resistance $R_e$ is placed in series with the emitter 14. The value of resistance $R_e$ may be between about 10 and 50 ohms.

The operation of the circuit is as shown in FIG. 6. For low values of input current, tunnel diode 10 remains in the low state and the curve 24 is obtained. When the current peak of the tunnel diode is exceeded, the tunnel diode switches to its high voltage state and curve 26 is obtained. The base to ground voltage $V_1$ now remains substantially constant at the high voltage of the tunnel diode (about 400 millivolts). The diode, in other words, acts as a clamp at voltage $V_1$. The emitter current which flows is such that $I_eR_e$ (the voltage across $R_e$) $+V_{eb}$ (the voltage across the emitter-to-base diode) $\cong V_1$. Increasing the input current $I_{in}$ does not appreciably change $V_1$, hence $I_e$, the emitter current, and therefore $I_c$, the collector current, remain substantially constant. As may be observed from the curves of FIG. 6, as the input current $I_{in}$ is increased from 120 microamperes to 240 microamperes, the transistor output current $I_c$ remains substantially constant. With proper choice of circuit values, the curves 26–**26*n* can be made to appear to converge. As $R_e$ is increased in value, the spread between curves 26–26*n* is decreased and also the spread between curves 24 and 26** is decreased. The reverse occurs as $R_e$ is decreased in value. The choice of $R_e$, in practice, depends upon design requirements. For example, in one particular circuit employing a 1 milliampere tunnel diode, a 22 ohm resistor was used; in another circuit employing a 2 milliampere tunnel diode a 10 ohm resistor was used. (The milliampere rating refers to point *b* in FIG. 9.)

Figure 8:
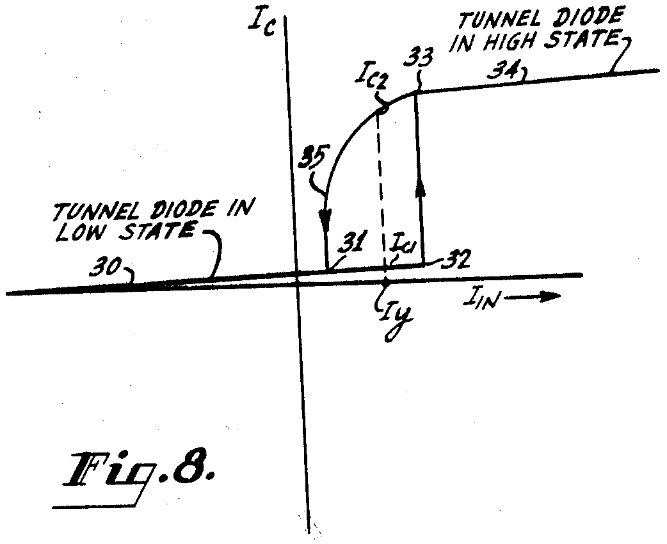
FIG. 8 is a curve of collector current versus base current for the circuit of FIG. 7.
Figure 7:
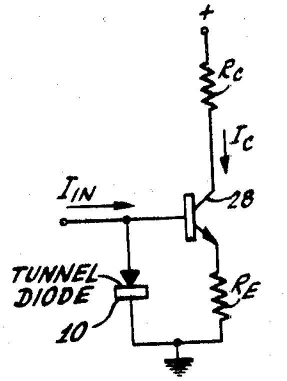
FIG. 7 is a schematic circuit diagram of another embodiment of the present invention.

If it is assumed now that the collector 28 is returned to a positive supply voltage through a load resistor $R_o$ as shown in FIG. 7, and the collector current is plotted as a function of the input current $I_{in}$, the curve of FIG. 8 is obtained. An important advantage of this circuit and the ones which follow is that the transistor is not driven to saturation, as the input current is increased, and therefore transistor storage effects do not limit the speed of response.

Figure 9:
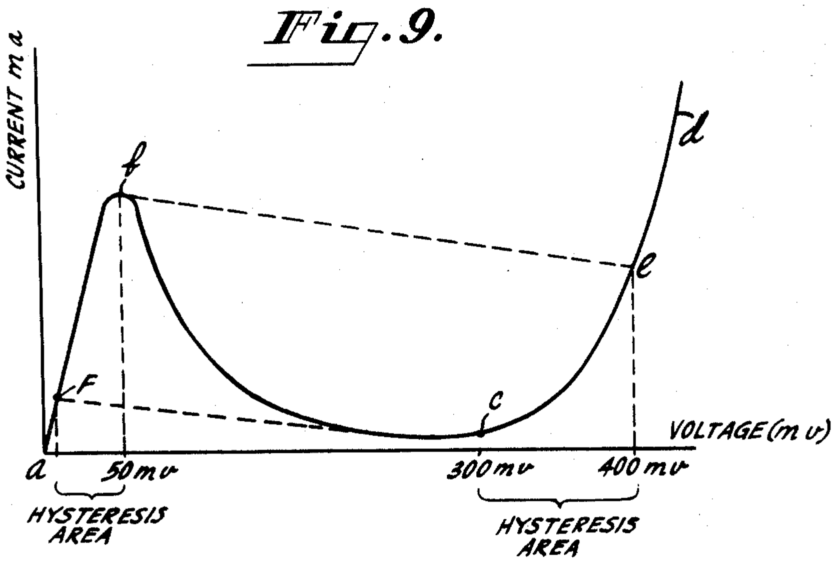
FIG. 9 is a characteristic curve of current versus voltage for a tunnel diode.

In operation, as the current $I_{in}$ is increased in the forward direction, the curve follows the path 30, 31, 32, 33, 34. As the current is subsequently decreased, the curve follows the path 34, 33, 35, 31, 30. The hysteresis in the curve may be explained by referring to FIG. 9 which is a characteristic curve of current versus voltage for the tunnel diode 10. The low voltage state of the tunnel diode is represented by the region *ab* and the high voltage state by the region *cd*. Assume that the diode is initially in its low voltage state. Assume also that the input current is obtained from a constant current source. As the input current increases, the operating point of the tunnel diode moves from point *a* to point *b*. When the current is made slightly greater than *b*, the operating point abruptly switches from point *b* in the low voltage state to some point *e* in the high voltage state. Point *e* represents a voltage of about 400 millivolts. The transition from *b* to *e* in FIG. 9 is represented in FIG. 8 as a transition from 32 to 33. If now the input current to the transistor is reduced, the tunnel diode operating point moves from point *e* to point *c* (FIG. 9). When the current is reduced to a point less than that represented by *c*, the diode abruptly switches from its high state to an operating point in its low state represented by *f* in FIG. 9. The transition from point *e* to point *c* (FIG. 9) is as shown at 33, 35 in FIG. 8. The transition from point *c* to point *f* is as shown at 35, 31 in FIG. 8.

In the hysteresis loop area 31, 32, 33, 35 of circuit operation, two different output quantities are possible for a given input quantity. For example, for a given input current, $I_y$ (FIG. 8), two different output currents $I_{c1}$ and $I_{c2}$ are possible. This type of operation is undesirable in applications in which a given input quantity must result in one and only one output quantity as, for example, in combinational logic circuits such as "and" circuits, "or" circuits, adders, etc. For these applications, the hysteresis area should be reduced substantially to zero as, for example, is shown in FIG. 10.

Figure 10:
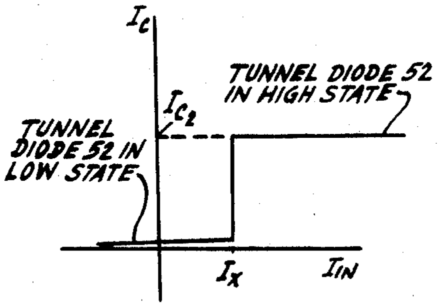
FIG. 10 is a curve of input current versus collector current for the circuit of FIG. 11.
Figure 11:
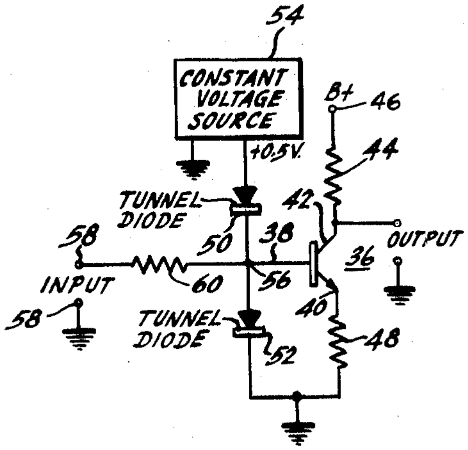
FIG. 11 is a block and schematic circuit diagram of another form of the present invention.

The circuit of FIG. 11 has an input current versus output current characteristic such as shown in FIG. 10. The circuit includes a NPN transistor 36 having base 38, emitter 40, and collector 42 electrodes. (It is to be understood that here and in other circuits discussed in this application PNP transistors are equally suitable, provided appropriately connected power supplies and appropriately poled tunnel diodes are used.) The collector 42 is connected through resistor 44 to a terminal 46 to which a positive voltage supply is connected. The emitter 40 is connected through a resistor 48 to ground. Two tunnel diodes 50 and 52 are connected in series between a constant voltage source 54 and ground. The common anode-cathode connection 56 of the tunnel diodes is connected to the base 38. An input current, such as a current pulse, may be applied from a constant current source to input terminals 58. Resistor 60 is a coupling element between input terminal 58 and common connection 56.

Figure 12:
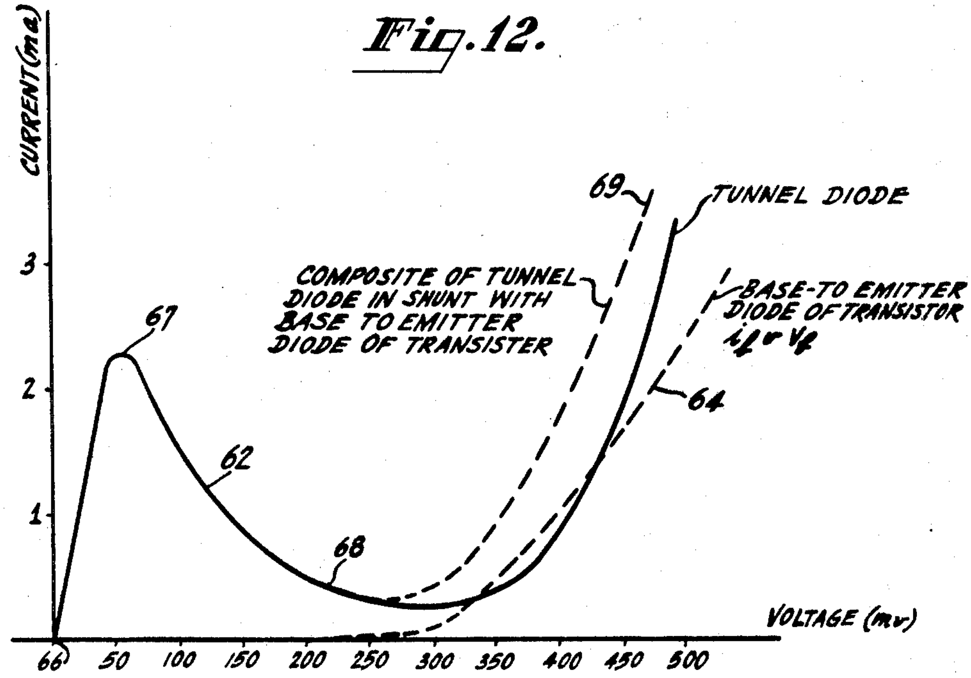
FIGS. 12 and 13 are curves to explain the operation of the circuit of FIG. 11.
Figure 13:
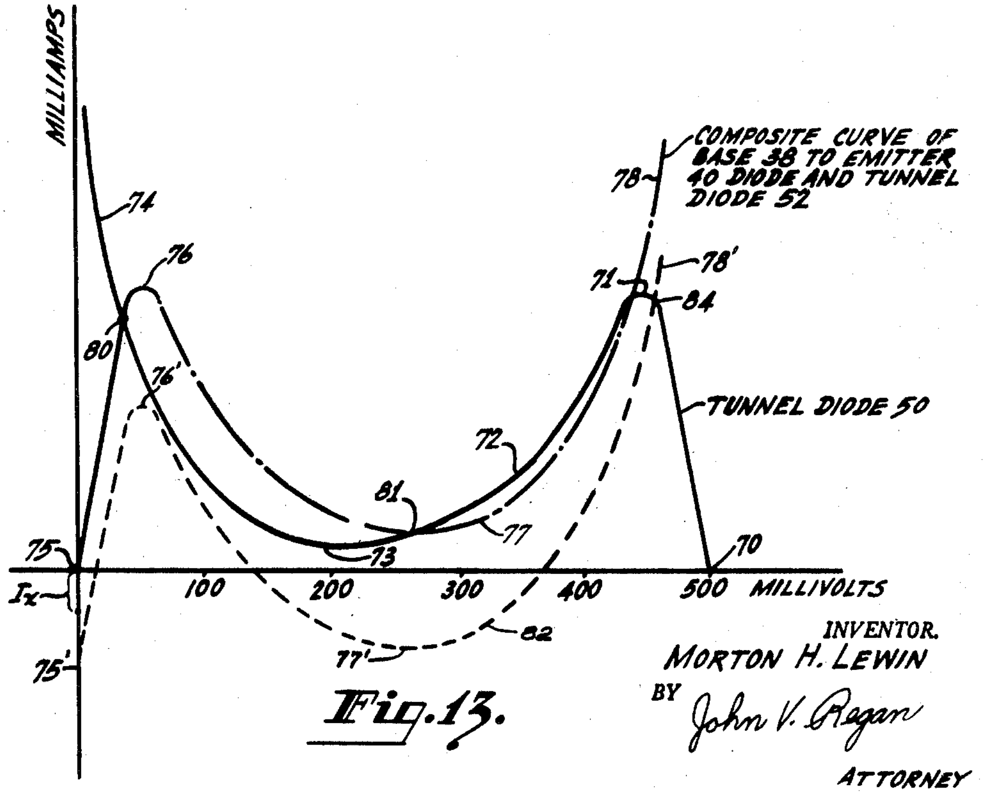

The operation of the circuit of FIG. 11 may be better understood by referring to FIGS. 12 and 13. Referring first to FIG. 12, solid line curve 62 is the characteristic curve for a tunnel diode such as 52 without any other circuits attached. In like manner, dashed curve 64 is a characteristic curve of base current versus base voltage looking into the base terminal of transistor 36 with operating voltages applied to the transistor but without the tunnel diode in the base circuit. The composite characteristic curve of the tunnel diode 52 in parallel with the base-to-emitter diode of transistor 36 is shown by curve 66, 67, 68, 69.

FIG. 13 should now be referred to. This is a plot for the circuit (FIG. 11) including transistor 36 and the two tunnel diodes 50 and 52. In this plot, the tunnel diode 50 is considered to be a load on the parallel combination of tunnel diode 52 and the base-to-emitter circuit of the transistor. The characteristic curve of current versus voltage for tunnel diode 50, acting as a load line, is as shown at 70, 71, 72, 73, 74. This is the same as curve 62 shown in FIG. 12 but reversed in position so that the origin of the load line occurs at point 70 or 500 millivolts (this is the voltage supplied by source 54). The low voltage state of the diode 50 represented by the load line is 70, 71 and the high voltage state is 73, 74.

The composite characteristic curve of current versus voltage for the tunnel diode 52 in parallel with the characteristic looking into the base terminal 38 is as shown by dot-dash curve 75, 76, 77, 78.

In operation, the 500 millivolts across the series circuit of diodes 50 and 52 is sufficient to place one of the diodes in its high state and the other in its low state. In the absence of any input current applied to input terminal 58, it may be observed in FIG. 13 that there is only one stable intersection between the characteristic curve for tunnel diode 50, and the composite characteristic curve for diode 52 and the transistor diode 38–40. This intersection is at point 80 which it may be seen corresponds to the low voltage state of diode 52 and the high voltage state of diode 50. The intersection 81 corresponds to the negative resistance operating region of tunnel diode 50 and is an unstable operating point. Accordingly, when the circuit is first turned on, diode 52 assumes its low voltage state and diode 50 its high voltage state.

If now a forward current is applied to input terminals 58, the effect of the current may be represented in FIG. 13 as a shift of the composite curve 75, 76, 77, 78 in the downward direction. When the input current is increased sufficiently, as for example, as indicated in the dashed curve 82, there is no longer a stable intersection between the low voltage operating region 75′, 76′ of the tunnel diode 52 characteristic and the high voltage operating region 73, 74 of the tunnel diode 50 characteristic. However, there is now a stable operating point at the intersection 84 of the high voltage operating region 77′, 78′ of the tunnel diode 52 characteristic and the low voltage operating region 70, 71 of the tunnel diode 50 characteristic. Put another way, when the input current is increased sufficiently, tunnel diode 52 switches from its low voltage state to its high voltage state and, correspondingly, tunnel diode 50 switches from its high voltage state to its low voltage state.

It can readily be seen that the circuit parameters may be adjusted so that there is little or no hysteresis. In other words, when the input current exceeds a given value $I_x$ (FIG. 13), a stable operating point corresponding to the low voltage state of diode 52 and the high voltage state of diode 50 ceases to exist, and substantially coincidentally in time there appears a stable intersection between the low voltage state of diode 50 and the high voltage state of diode 52. Conversely, when the input current reduces to a value less than $I_x$, there is no longer a stable operating point corresponding to the high voltage state of diode 52 and the low voltage state of diode 50 and coincidentally a stable operating point appears for the low voltage state of diode 52 and the high voltage state of diode 50. This input current $I_x$ is shown in FIG. 10.

A typical circuit according to FIG. 11 may have the following circuit values:

| | |
|---|---|
| Tunnel diodes **50** and **52** | Germanium diodes having a current peak of 2 ma. |
| Resistor **48** | 10 ohms. |
| Resistor **44** | 300 ohms. |
| B+ (at terminal **46**) | 10 volts. |

Figure 14:
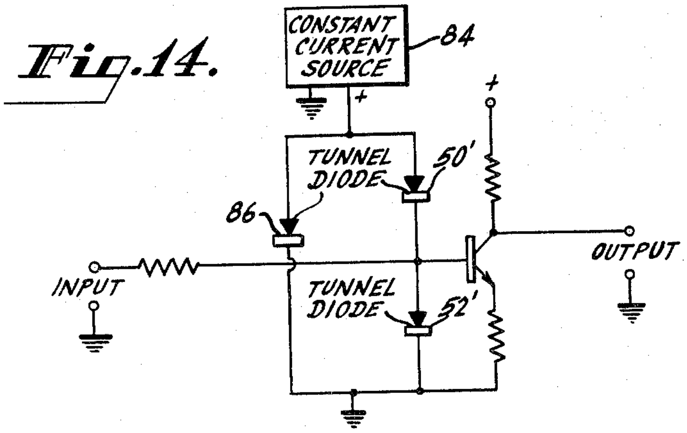
FIG. 14 is a block and schematic circuit diagram of another form of the present invention.

The circuit of FIG. 14 is the same as that of FIG. 11 except that a constant current source 84 is employed rather than the constant voltage source. The constant voltage source, however, is simulated by the tunnel diode 86 which is maintained always in the high state by the current supplied by source 84. Thus, the voltage across tunnel diodes 50′ and 52′ is always maintained at a level such that one of these diodes is in the high voltage state and the other in the low voltage state. If desired, a conventional positive resistance diode may be substituted for tunnel diode 86 to simulate a constant voltage source.

Figure 15:
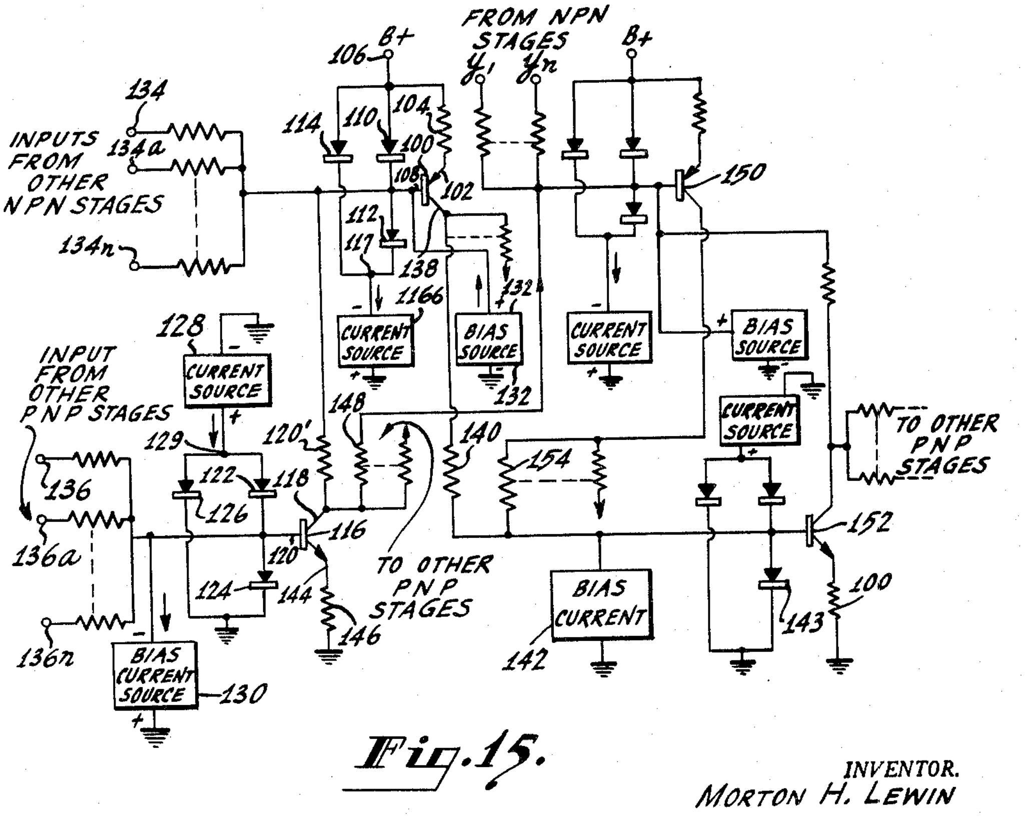
FIG. 15 is a block and schematic circuit diagram of a logical network according to the present invention.

A network for implementing basic logic functions using circuits of the present invention is shown in FIG. 15. Each stage is similar to the circuit of FIG. 14 except that certain of the stages use PNP type transistors. Only one PNP and one NPN stage are described in detail. The upper PNP stages are driven by a plurality of NPN stages including stage 116 shown in detail at the bottom of the figure. Similarly the bottom NPN transistors are driven by a plurality of PNP transistors. For example, the NPN transistor 152 shown in detail at the bottom of the figure is driven by both upper PNP transistors.

The first of the PNP stages includes a transistor 100 the emitter 102 of which is connected through a resistor 104 to a terminal 106 to which a positive supply voltage is applied. The base 108 is connected between two tunnel diodes 110 and 112. A third tunnel diode 114 is connected in shunt across the two tunnel diodes

110, 112. A current source 1166 which produces a current of the polarity indicated by an arrow is connected between the common cathode connection 117 of tunnel diodes 112 and 114 and ground. This arrow and each of the other arrows herein indicate the direction of positive, conventional current flow.

The first NPN stage includes a transistor 116 having a collector 118 connected via resistor 120′ to apply an input to the base 108 of PNP transistor 100. The base 120 of transistor 116 is connected between tunnel diodes 122 and 124. A third tunnel diode 126 is connected in shunt across tunnel diodes 122 and 124. A current source 128 is connected between ground and the common anode connection 129 of diodes 122 and 126.

Transistor 116 is normally maintained cut off by the bias current source 130 (tunnel diode 124 is in its low state). Similarly, NPN transistor 100 is normally maintained cut off from the bias current source 132. If desired, a common bias current source can be used for each of the transistors.

Input pulses are applied to the base 108 of PNP transistor 100 from a number of other NPN stages. Some of these stages are connected to terminals 134–**134*n*. One of the stages is 116 and its output is applied from collector 118 to the base 108 through resistor 120′. Input pulses from a plurality of PNP stages are applied to the base 120 of transistor 116. These may be applied to terminals 136–136*n***.

The type of logic performed by the circuits of FIG. 15 depends in part upon the quiescent bias applied to the bases of the transistors. It may be assumed that transistor PNP 100 is biased to operate as an "and" stage and NPN transistor 116 is biased to operate as an "or" stage. Operation as an "and" stage implies that the transistor output switches from a level indicative of one binary digit (such as binary "zero") to another level indicative of another binary digit (such as binary "one") only in response to the concurrent application of N input pulses. Assume, for example, that there are N input stages connected to the base of the PNP transistor 100 and assume also that each input stage applies a current pulse of amplitude M. In this case the bias source 132 is adjusted to a value such that a current of amplitude $N \times M$ is required to switch tunnel diode 112 from one state to the other. By the same token, if the NPN transistor 116 is quiescently biased as an "or" stage, the bias source 130 is regulated so that only a single input of amplitude M is required to switch tunnel diode 124 from one state to the other.

Operating voltages are applied to the transistors in the following manner. The positive supply voltage is applied from terminal 106 through resistor 104 to the emitter 102 of transistor 100. This circuit continues to the collector 138 of the transistor 100 through resistor 140 and through the parallel paths which include the bias current source 142 and the tunnel diode 143 to ground. The operating voltage for NPN transistor 116 is applied from terminal 106 through tunnel diode 110, through resistor 120 to the collector 118 of transistor 116. The circuit is completed via emitter 144 and resistor 146 to ground.

The tunnel diodes at the input of each transistor 100, 116 are normally quiescently biased to a value such that the diode in one branch 114 (and 126), is always in its high state. One of the diodes in the other branch 110, 112, 122, 124 is in the high state and the other is in the low state. As already mentioned, when operated as an "and" circuit, the quiescent bias current is such that N input pulses are required to exceed an input current $I_x$ (see FIG. 10). In like manner, when operated as an "or" circuit, the quiescent bias current is such that a single input current pulse is sufficient to exceed the input current $I_x$ (FIG. 10). Any desired combination of multi-input "and"-"or" circuits can be provided by suitably adjusting the bias current sources of the respective transistors.

It may be observed in FIG. 15 that NPN transistor 116 supplies an output current through resistor 120' to the base 108 of PNP transistor 100, through resistor 148 to the base of PNP transistor 150, and through other resistors to a number of other PNP stages. PNP transistor 100 supplies its output through resistor 140 to the base of NPN transistor 152 and through other resistors to a number of other NPN stages. PNP transistor 150 supplies its output through resistor 154 to the base of NPN transistor 152, and through other resistors to the bases of a number of other NPN stages, and so on.

With a circuit such as described above, one stage may supply its output ("fan-out") to 10, 15 or more other logic stages. It is also possible to use weighted threshold logic in which one input, when it is high, delivers an input current two or three times as large as some other input. It is also possible to obtain an inversion by following one NPN stage by another NPN stage or one PNP stage by another PNP stage as in resistor-transistor logic. In this case, the collector output voltage of the second transistor of an NPN or PNP pair is the desired inverted output signal. Advantages of circuits of these types include large "fan-out" ratios, high speed, very little drift, low power dissipation, small size, and relatively low cost.

What is claimed is:

1. In combination, a transistor having a base, an emitter and a collector, and a path between said emitter and collector; an impedance connected to said emitter-to-collector path of the transistor, said impedance including a resistor connected between the emitter of said transistor and a point of reference potential; means for applying an operating current to the transistor, which current flows through said impedance; and negative resistance diode means having two stable operating regions, one in a different voltage range than the other, connected to the base of said transistor for maintaining the current flow through said impedance at one substantially constant level when the diode means is in one of its stable operating regions and at another substantially constant level when the diode means is in the other of its stable operating regions.

2. In the combination as set forth in claim 1, said negative resistance diode means including a pair of negative resistance diodes connected anode-to-cathode and connected at said anode-to-cathode connection to the base of the transistor, and means for applying a voltage across said two diodes which is sufficient to maintain one diode in its high state and the other in its low state.

3. In combination, a transistor having emitter, base, and collector electrodes; a tunnel diode connected between the base of the transistor and a point of reference potential; and a resistor connected between the emitter of the transistor and said point of reference potential.

4. In combination, a transistor having emitter, base, and collector electrodes; a resistor connected to the base-to-emitter diode of the transistor; a tunnel diode connected across the circuit of said resistor and the base-to-emitter diode of the transistor, the two diodes being connected like element to like element; a connection for supplying an operating voltage to said collector and means for applying signals to the tunnel diode for switching the same from one stable state to another.

5. In combination, a transistor having emitter, base, and collector electrodes; a resistor connected to said emitter; a tunnel diode connected across the circuit of said resistor and the base-to-emitter diode of the transistor, the two diodes being connected like element to like element; a second tunnel diode connected at one electrode to the base of the first transistor and connected at the same electrode to the first tunnel diode, anode-to-cathode; and means for applying a substantially constant voltage across the circuit of the anode and cathode connected tunnel diodes at a level to place one tunnel diode in its high voltage state and the other in its low voltage state.

6. In combination, a PNP transistor having emitter, base, and collector electrodes; a tunnel diode, the anode of which is connected to said base electrode; an NPN transistor having emitter, base and collector electrodes; a second tunnel diode the anode of which is connected to the base electrode of said NPN transistor; a connection from an electrode other than the base electrode of one of said transistors to the base electrode of the other; and two resistors, one connected to each emitter electrode in series with the emitter-to-collector path of each transistor.

7. In combination, a first pair of tunnel diodes connected anode-to-cathode; a second pair of tunnel diodes similarly connected anode-to-cathode, each of the tunnel diodes being capable of assuming one of two different operating states, one in a higher voltage range than the other; an NPN transistor the base of which is connected to the common anode-to-cathode connection of said first pair of tunnel diodes; a PNP transistor the base of which is connected to the common anode-to-cathode connection of said second pair of tunnel diodes; means for biasing each pair of tunnel diodes so that one diode of each pair is in one of its operating states and the other diode of each pair is in the other of its operating states; means for applying an operating voltage to the emitter of one transistor and through one of the tunnel diodes connected to the base of that transistor to the collector of the other transistor; a connection from the collector of said one transistor to the base of said other transistor; and a connection from the emitter of said other transistor to a point of reference potential.

8. In combination, a first pair of tunnel diodes connected anode-to-cathode; a second pair of tunnel diodes similarly connected anode-to-cathode, each of the tunnel diodes being capable of operating in one of two different states, one in a higher voltage range than the other; an NPN transistor the base of which is connected to the common anode-to-cathode connection of said first pair of tunnel diodes; a PNP transistor the base of which is connected to the common anode-to-cathode connection of said second pair of tunnel diodes; bias current source means connected to each pair of tunnel diodes for placing one diode in each pair in its higher voltage operating state and the other diode in each pair in its lower voltage operating state; a connection from the collector electrode of one of said transistors to the base electrode of the other transistor; and a common source connected to both transistors for applying operating currents to both transistors.

9. The combination as set forth in claim 8, further including a resistor in series with the emitter-to-base diode of each transistor.

10. The combination as set forth in claim 9, further including a pair of constant voltage source means, one connected across each pair of tunnel diodes.

11. In the combination as set forth in claim 10, each said constant voltage source means comprising a tunnel diode which is always maintained in its high voltage state.

12. In the combination as set forth in claim 8, the collector electrode of said NPN transistor being connected to the base electrode of said PNP transistor, and said source of operating voltage being connected directly to the emitter electrode of said PNP transistor and through one of the tunnel diodes connected to the base electrode of said PNP transistor to the collector electrode of said NPN transistor.

13. In combination, a transistor having emitter, base and collector electrodes; a resistor connected between said emitter electrode and a source of reference potential; a tunnel diode connected across the series circuit of said resistor and the emitter-to-base diode of the transistor; means for applying an operating voltage to the transistor; means for applying an input signal to the tunnel diode; and a terminal at said collector electrode at which an output signal may be obtained.

14. In combination, a transistor having emitter, base and collector electrodes; a resistor connected between said emitter electrode and a source of reference potential; a tunnel diode connected across the series circuit of said resistor and the emitter-to-base diode of the transistor, the two diodes being connected like element to like element; a second tunnel diode connected to the first tunnel diode in the same polarity as the first tunnel diode and connected also to said base electrode at its connection to the first tunnel diode; a voltage source connected across the two tunnel diodes in a sense to apply an operating voltage in the forward direction to the two tunnel diodes; means coupled to the base electrode of said transistor for applying an input pulse to said base electrode; and a terminal at said collector electrode at which an output signal may be obtained.

15. In combination, a transistor having an emitter, a base, and a collector; a two terminal impedance connected at one terminal to the emitter of the transistor; means for applying an operating current to said transistor, which current flows through said impedance; and a tunnel diode which is capable of assuming one of two voltage states, one in a lower voltage range than the other, connected between the base of the transistor and the other terminal of said impedance for maintaining the current through said impedance at one substantially constant level when the tunnel diode is in the lower of its voltage states and at another substantially constant level when the tunnel diode is in the higher of its voltage states.

16. In combination, a transistor having an emitter, a base and a collector; a resistor having a value of not greater than approximately 50 ohms connected at one terminal to the emitter of the transistor; and a tunnel diode connected between the base of the transistor and the other terminal of the resistor.

17. In combination, a transistor having emitter, base and collector electrodes; a resistor connected to said emitter; a tunnel diode connected across the circuit of said resistor and the base-to-emitter diode of the transistor, the two diodes being connected like element to like element; a second tunnel diode connected to the first tunnel diode, anode-to-cathode; and means for applying a substantially constant voltage across the circuit of the anode-to-cathode connected tunnel diodes at a level to place one tunnel diode in its high state and the other in its low state, said last-named means comprising a third tunnel diode connected across the circuit of the first two tunnel diodes, and a substantially constant current source connected to the third tunnel diode for always maintaining the same in its high voltage state.

18. In combination, a transistor having emitter, base and collector electrodes; a resistor connected between said emitter electrode and a source of reference potential; a tunnel diode connected across the series circuit of said resistor and the emitter-to-base diode of the transistor, the two diodes being connected like element to like element; a second tunnel diode connected in series with the first tunnel diode in the same polarity as the first tunnel diode and connected also to said base electrode; a voltage source including a third tunnel diode connected across the two tunnel diodes in a sense to apply an operating voltage in the forward direction to the two tunnel diodes; means coupled to the base electrode of said transistor for applying an input pulse to said base electrode; and a terminal at said collector electrode at which an output signal may be obtained.

References Cited by the Examiner

UNITED STATES PATENTS

| | | | |
|---|---|---|---|
| 2,614,140 | 10/52 | Kreer | 307—88.5 |
| 2,885,149 | 5/59 | Clapper | 307—88.5 X |
| 2,927,733 | 3/60 | Campbell | 307—88.5 |
| 2,975,377 | 3/61 | Price | 307—88.5 |
| 3,094,630 | 6/63 | Rapp et al. | 307—88.5 |

OTHER REFERENCES

Pub. I, Electronics, pages 60–64, November 27, 1959.

IRE Wescon Convention Record, August 18, 1959, part 3, Electron Devices, pages 9 to 31.

Hurley: Junction Transistor Electronics, Wiley, 1958, page 80.

Shea: Transistor Circuit Engineering, Wiley, 1957, page 89.

ARTHUR GAUSS, *Primary Examiner.*

HERMAN KARL SAALBACH, *Examiner.*